(12) United States Patent
Nilsson

(10) Patent No.: US 12,104,346 B2
(45) Date of Patent: Oct. 1, 2024

(54) FRONT LOADER FOR A WORKING VEHICLE AND A WORKING VEHICLE

(71) Applicant: ÅLÖ AB, Umeå (SE)

(72) Inventor: Tommy Nilsson, Umeå (SE)

(73) Assignee: ÅLÖ AB, Umeå (SE)

( * ) Notice: Subject to any disclaimer, the term of this patent is extended or adjusted under 35 U.S.C. 154(b) by 24 days.

(21) Appl. No.: 18/003,748

(22) PCT Filed: Jun. 23, 2021

(86) PCT No.: PCT/SE2021/050626
§ 371 (c)(1),
(2) Date: Dec. 29, 2022

(87) PCT Pub. No.: WO2022/005371
PCT Pub. Date: Jan. 6, 2022

(65) Prior Publication Data
US 2023/0257959 A1      Aug. 17, 2023

(30) Foreign Application Priority Data
Jul. 1, 2020 (SE) .................................. 2050817-2

(51) Int. Cl.
*E02F 3/34* (2006.01)
(52) U.S. Cl.
CPC .......... *E02F 3/3408* (2013.01); *E02F 3/3417* (2013.01)
(58) Field of Classification Search
CPC ............................. E02F 3/3408; E02F 3/3417
See application file for complete search history.

(56) References Cited

U.S. PATENT DOCUMENTS

| 4,264,264 | A | | 4/1981 | Hallale et al. |
| 5,192,179 | A | * | 3/1993 | Kovacs ................. E02F 3/3408 |
| | | | | 414/710 |

(Continued)

FOREIGN PATENT DOCUMENTS

| EP | 1903147 A2 | 3/2008 |
| EP | 1997960 A2 | 12/2008 |

(Continued)

OTHER PUBLICATIONS

International Search Report and Written Opinion issued by the European Patent Office acting as International Searching Authority for International Patent Application No. PCT/SE2021/050626 dated Oct. 13, 2021 (14 total pages).

(Continued)

*Primary Examiner* — Saul Rodriguez
*Assistant Examiner* — Brendan P Tighe
(74) *Attorney, Agent, or Firm* — Dinsmore & Shohl LLP

(57) ABSTRACT

The invention relates to a front loader (10) comprising: at least one fastening arrangement (12) connectable to a working vehicle (1); at least one loader arm (20) with a first part (21) and a second part (22) connected via a knee section (23), the first part (21) being pivotally connected to the fastening arrangement (12) at a pivot point (P1); a tool attachment (14) device connected to the second part (22) of the at least one loader arm (20); at least one tilting cylinder (16) connected to the tool attachment device (14) and to a knee link (30) arranged at the knee section (23), wherein the knee link (30) comprises a first attachment point (31) for connection with the tilting cylinder (16), a second attachment point (32) for connection with the loader arm (20), and a third attachment point (33) for connection to a mechanical self-levelling device (50), wherein the knee link (30) is arranged at the knee section (23), such that the first attach- (Continued)

ment point (31) is essentially aligned with or below an upper end (24) of the first part (21) of the loader arm (20).

10 Claims, 4 Drawing Sheets

(56) References Cited

U.S. PATENT DOCUMENTS

| | | | | |
|---|---|---|---|---|
| 6,142,724 | A * | 11/2000 | Hirooka | E02F 3/6273 |
| | | | | 414/722 |
| 7,354,237 | B2 * | 4/2008 | Frey | E02F 3/38 |
| | | | | 414/917 |
| 7,568,878 | B2 * | 8/2009 | Frey | E02F 3/34 |
| | | | | 414/917 |
| D628,604 | S * | 12/2010 | Major | D15/28 |
| 9,587,370 | B2 * | 3/2017 | Lanting | E02F 3/6273 |
| 10,119,242 | B1 * | 11/2018 | Faivre | E02F 3/627 |
| 10,519,623 | B2 * | 12/2019 | Nadaoka | E02F 3/6273 |
| 10,662,609 | B2 | 5/2020 | Hallale et al. | |
| 2004/0042888 | A1 | 3/2004 | Westendorf et al. | |
| 2011/0140402 | A1 * | 6/2011 | Lanting | E02F 3/6273 |
| | | | | 280/763.1 |
| 2012/0102768 | A1 | 5/2012 | Friesen et al. | |

FOREIGN PATENT DOCUMENTS

| | | |
|---|---|---|
| EP | 2857590 A2 | 4/2015 |
| JP | 2016084617 A | 5/2016 |
| KR | 20150033817 A | 4/2015 |
| WO | 2008011661 A1 | 1/2008 |

OTHER PUBLICATIONS

Swedish Search Report issued by the Swedish Patent Office for Swedish Application No. 2050817-2 dated Jan. 29, 2021 (4 total pages).

\* cited by examiner

FRONT LOADER FOR A WORKING VEHICLE AND A WORKING VEHICLE

TECHNICAL FIELD

The present invention relates a front loader for a working vehicle. The invention also relates to a working vehicle comprising such a front loader.

BACKGROUND

In the agricultural field, working vehicles may be provided with various types of tools or implements in order to perform the work. Such a tool may be a lifting fork, a bucket or similar. The working vehicles may therefore comprise a lifting arrangement called front loader arranged at the front of the working vehicle, to which front loader a suitable tool is removably attached. Front loaders typically comprise two elongated loader arms arranged in parallel and extending in the forward direction of the working vehicle. The front loaders also comprise lift cylinders for pivoting the loader arms in relation to the working vehicle, and tilting cylinders for tilting the tool attached to the front loader in relation to the loader arm. How the front loader is positioned in relation to the working vehicle and the configuration and design of the front loader may affect the visibility for the operator of the working vehicle. Obstructed visibility is a common problem with known front loaders and may for example be caused by a linkage connected to the tilting cylinders and a mechanical self-levelling device. There are different types of mechanical self-levelling devices. Overlying self-levelling devices are arranged in association with the upper part of the loader arm and underlying are arranged in association with the lower part of the loader arm. There are also solutions where the self-levelling device is arranged inside the loader arm, and is thus internally arranged. Specifically overlying self-levelling devices may cause obstructed visibility. It is thus desired to achieve a front loader, which enables good visibility of the operator of the working vehicle.

SUMMARY

Despite known solutions in the field, it would be desirable to develop a front loader and a working vehicle, which overcomes or alleviates at least some of the drawbacks of the prior art.

An object of the present invention is thus to achieve an advantageous front loader for a working vehicle, which enables an improved visibility for an operator of the working vehicle. Another object of the present invention is to achieve an advantageous front loader, which enables modularity, facilitates manufacturing and is more cost-efficient.

The herein mentioned objects are achieved by a front loader and a working vehicle comprising such a front loader according to the independent claims.

Hence, according to an aspect of the present invention, a front loader for a working vehicle is provided, the front loader comprising: at least one fastening arrangement connectable to the working vehicle; at least one loader arm with a first part and a second part connected via a knee section, the first part being pivotally connected to the fastening arrangement at a pivot point; a tool attachment device connected to the second part of the loader arm; at least one tilting cylinder connected to the tool attachment device and to a knee link arranged at the knee section of the at least one loader arm, wherein the knee link comprises a first attachment point for connection with the tilting cylinder, a second attachment point for connection with the loader arm, and a third attachment point for connection to a mechanical self-levelling device configured to be arranged externally of the loader arm and to be connected to the fastening arrangement at a point positioned above the pivot point of the loader arm, wherein the knee link is arranged at the knee section, such that the first attachment point is essentially aligned with or below an upper end of the first part of the loader arm.

According to another aspect of the present invention, a working vehicle is provided, the working vehicle comprising a front loader as disclosed herein.

By having a knee link, which is arranged, such that the first attachment point is essentially aligned with or below the upper end of the first part of the loader arm, the upper end of the knee link can be essentially aligned with or below the upper end of the first arm of the loader arm. The knee link will thereby not obstruct the visibility, even when the front loader has an overlying mechanical self-levelling device connected to the third attachment point. Mechanical self-levelling devices connected to the fastening arrangement at a point positioned above the pivot point of the loader arm are defined as overlying self-levelling devices. Commonly known front loaders with externally arranged overlying self-levelling devices typically comprises knee links which extend beyond and above the loader arm, when the loader arm is in a lowered position, and the knee link will then obstruct the visibility. Thus, by means of the front loader according to the present invention, a lower profile of the front loader is achieved and the visibility from the working vehicle is improved.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present disclosure and further objects and advantages of it, the detailed description set out below should be read together with the accompanying drawings, in which the same reference notations denote similar items in the various drawings, and in which.

DETAILED DESCRIPTION

Figure 1A:
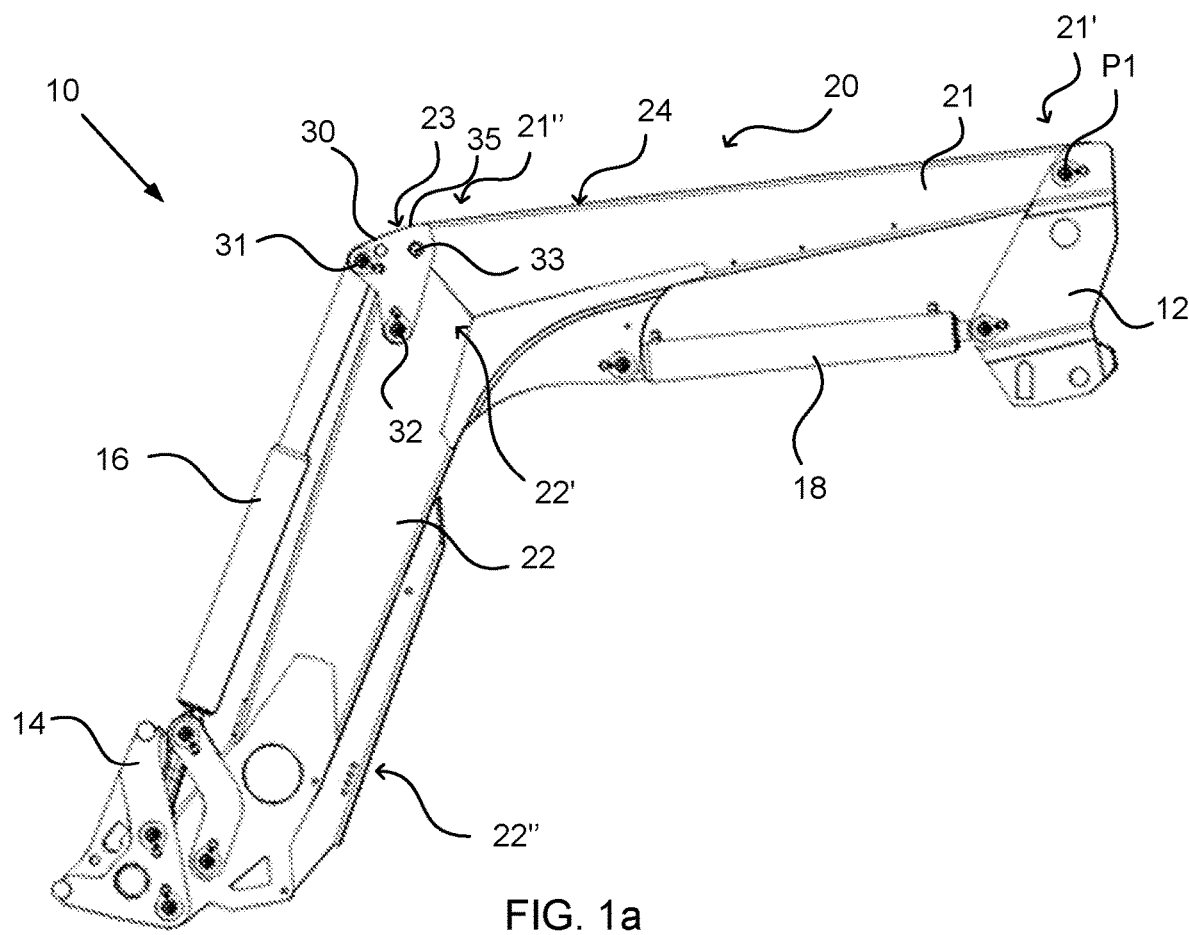
FIGS. 1a-b schematically illustrate a front loader according to examples.

To achieve an improved and cost-efficient front loader, a front loader and a working vehicle according to the present disclosure has been developed. The present disclosure is applicable on all sorts of working vehicles, such as construction vehicles, mining vehicles, forestry vehicles, agricultural vehicles or similar.

Hence, according to an aspect of the present disclosure, a front loader for a working vehicle is provided. The front loader comprises: at least one fastening arrangement connectable to the working vehicle; at least one loader arm with a first part and a second part connected via a knee section, the first part being pivotally connected to the fastening arrangement at a pivot point; a tool attachment device connected to the second part of the loader arm; at least one tilting cylinder connected to the tool attachment device and to a knee link arranged at the knee section of the at least one loader arm, wherein the knee link comprises a first attachment point for connection with the tilting cylinder, a second attachment point for connection with the loader arm, and a third attachment point for connection to a mechanical self-levelling device configured to be arranged externally of the loader arm and to be connected to the fastening arrangement at a point positioned above the pivot point of the loader arm, wherein the knee link is arranged at the knee section, such that the first attachment point is essentially aligned with or below an upper end of the first part of the loader arm.

The front loader may also be referred to as a lifting arrangement or a front loader arrangement. The front loader comprising a knee link with an attachment point for an externally arranged mechanical self-levelling device means that the front loader is configured to comprise an externally arranged mechanical self-levelling device. The externally arranged mechanical self-levelling device configured to be arranged externally of the loader arm and to be connected to the fastening arrangement at a point positioned above the pivot point of the loader arm will herein be referred to as an overlying self-levelling device.

The loader arm is pivotable in relation to the fastening arrangement about the pivot point and can thus be pivoted/moved from a lowered position to a plurality of raised positions. It is to be understood that positions mentioned herein, such as below or above, relate to positions when the loader arm is in the lowered position. It is also to be understood that positions mentioned herein, such as below, above and lower, relates to vertical positions and are thus in relation to the ground on which the working vehicle is standing. Hence, a first component being arranged lower than, or below, a second component means that the first component is closer to the ground than the second component. The front loader may comprise at least one lift cylinder connected to the loader arm and to the fastening arrangement. The lift cylinder may be connected to the fastening arrangement at a point vertically below the pivot point of the loader arm. The fastening arrangement is configured to be attached to the working vehicle. The lift cylinder may thus be controlled to pivot the loader arm upwards and downwards in relation to the working vehicle, when the front loader is attached to the working vehicle. The lift cylinder may be a hydraulic cylinder.

The first part of the loader arm extends in the forward direction of the working vehicle in the lowered position. The second part of the loader arm extends towards the ground in the lowered position. The first part and the second part are elongated. The first part and the second part forms the knee section where they meet and are connected to each other. The first part may be essentially horizontal when the front loader is in the lowered position and the second part may be essentially vertical in the lowered position. Alternatively, the first part and the second part may be arranged with an angle larger than 90 degrees between them. The first part may be slightly inclined downwards in the lowered position and the second part may be slightly inclined away from the fastening arrangement and the first part of the loader arm. This way, the tool attachment device connected to the second part will be the most forward part of the front loader in the lowered position. The first part may comprise a first end connected to the fastening arrangement and a second end forming the knee section connecting with the second part. The second part may comprise a first end forming the knee section and connecting with the first part, and a second end connected to the tool attachment device. The tool attachment device is configured to receive and be connected to a tool, such as a bucket, lifting forks or similar. The tool attachment device can be tilted by means of the tilting cylinder. This way, the tool attached to the tool attachment device can be tilted. Thus, movement of the tool attachment and the tool, when attached, can be controlled by the tilting cylinder. The tilting cylinder may extend in parallel with the second part of the loader arm. The tilting cylinder may be a hydraulic cylinder.

The knee link on the loader arm may comprise two plates arranged on opposite sides of the knee section. Each plate comprises holes forming the first attachment point, the second attachment point and the third attachment point and the plates are arranged with the holes symmetrically arranged on opposite sides of the knee section. The two plates may extend beyond the knee section in the forward direction of the working vehicle, such that the first attachment point is arranged in front of the knee section of the loader arm. The upper end of the two plates, and thus the upper end of the knee link, is aligned with, or below, the upper end of the first part of the loader arm. The tilting cylinder may be connected to the first attachment point via a pivot pin extending between the holes of the two plates and thereby connecting the two plates. The second attachment point may be a pivot point. Thus, the knee link may be pivotally connected to the loader arm via the second attachment point. The knee link may be connected to the loader arm by inserting a fastener or pin through the holes of the knee link and corresponding holes in the loader arm.

In one example, the front loader comprises two loader arms arranged in parallel. The two loader arms may be connected to each other by means of at least one transverse support. The front loader may thus comprise at least one transverse support. The at least one transverse support may be arranged at the second end of the second part of the loader arms. The front loader may thus comprise two fastening arrangements where each loader arm is connected to one fastening arrangement. The front loader may further comprise two tilting cylinders, each connected to the tool attachment device and to a respective loader arm. The tool attachment device may extend transversely between the two loader arms. When the front loader comprises two loader arms, the front loader may also comprise two lift cylinders, each connected to one fastening arrangement and one loader arm. It is to be understood that where features or applications of the loader arm, knee link, tilting cylinder or lift cylinder of the front loader is described herein, it is valid for the case where the front loader comprises one loader arm as well as when it comprises two loader arms arranged in parallel.

The lift cylinder(s) and/or the tilting cylinder(s) may be connectable to a respective hydraulic circuit on the working vehicle. The extraction/retraction of the cylinders may thereby be controlled by means of controlling the flow of fluid in the respective hydraulic circuit.

According to an example of the present disclosure, the second attachment point is positioned below the pivot point of the loader arm when the loader arm is in the lowered position. The second attachment point of the knee link may be positioned at the second part of the loader arm. The second attachment point may thus be positioned below the first attachment point when the loader arm is in the lowered position.

In one example, the third attachment point is positioned below the upper end of the first part of the loader arm. Having the third attachment point positioned below the upper end of the first part of the loader arm enables connection of a self-levelling device at a lower position compared to known solutions. This way, the self-levelling device would get a lower position and the visibility from the working vehicle would thereby be improved. The third attachment point may be positioned between the first attachment point and the second attachment point, in vertical direction. The third attachment point may be positioned radially inwards from the tip of the knee section. With a third attachment point below the upper end of the first part of the loader arm, any overlying self-levelling device connected to the third attachment point will not obstruct the visibility.

According to an example, the front loader further comprises a mechanical self-levelling device connected to the knee link and to the fastening arrangement, wherein the self-levelling device is arranged externally of the loader arm and is connected to the fastening arrangement at a connection point positioned above the pivot point of the loader arm. Thus, the front loader may comprise an overlying self-levelling device. The self-levelling device is connected to the third attachment point. The self-levelling device is mechanically configured to ensure that the tool attachment device, and thus the tool attached to the tool attachment device, maintain the same tilting angle in relation to the ground when the loader arm is pivoted upwards and downwards. The self-levelling device is thus configured to ensure that the tool attachment device is level with the ground. The self-levelling device may be arranged, such that the third attachment point is positioned below the connection point to the fastening arrangement when the loader arm is in the lowered position.

The self-levelling device may comprise at least one strut configured to at least partly cover the upper end of the first part of the loader arm, wherein the strut comprises an opening at a first end connected to the knee link. In the event that the front loader comprises two loader arms arranged in parallel, the self-levelling device comprises two struts configured to at least partly cover the upper end of the first part of the respective loader arm. The at least one strut may be referred to as a control rod or similar. The strut is thus attached to the knee link at the third attachment point and to the fastening arrangement. The strut may be pivotally attached to the knee link at the third attachment point. The at least one strut may comprise a first end attached to the knee link, and a second end connected to the fastening arrangement. The at least one strut may be attached to each plate of the knee link and thus on both sides of the loader arm. The first end of the strut may comprise a first through hole for connection to the knee link. Suitably, the self-levelling device is connected to the knee link by inserting a fastener or pin through the first through hole of the self-levelling device, the corresponding holes of the knee link and corresponding holes of the loader arm. The second end of the strut may comprise a second through hole. Suitably, the self-levelling device is connected to the fastening arrangement by inserting a fastener or pin through the second through hole of the self-levelling device and the corresponding holes of the fastening arrangement and the loader arm. The opening at the first end of the strut may be configured, such that the strut does not cover the knee section of the loader arm.

The strut may have an essentially u-shaped cross-section and comprise a top wall and two side walls, wherein the opening is formed in the top wall at the first end of the strut. The opening formed in the top wall may means that the first end of the self-levelling device/strut does not have any top wall. The strut may be arranged with an inside of the top wall abutting or at least extending in parallel with the upper end of the first part of the loader arm, with the side walls extending downwards along the sides of the first part. The side walls of the strut may thus cover at least a part of the sides of the first part of the loader arm. The opening in the strut being in the top wall means that the first end of the strut only comprises the side walls. At the first end of the strut, the side walls will form a first and second fork attached to the knee link at the third attachment point. By having an opening in the strut, the third attachment point can be positioned on a lower position compared to known solutions. This way, the knee link can be arranged on a lower position on the knee section and the knee link will thereby improve the visibility from the working vehicle.

In one example, the front loader further comprises a reinforcement device for the connection between the mechanical self-levelling device and the knee link. The reinforcement device may thus be arranged in association with the first end of the mechanical self-levelling device. The reinforcement device may form part of the mechanical self-levelling device. Alternatively, the reinforcement device forms part of the knee link. In one example, the reinforcement device comprises two reinforcement elements extending on opposite sides of the first end of the strut. The reinforcement elements may be arranged on the outside of the first and second fork formed at the first end of the strut. The reinforcement elements may have a similar shape/design as the first and second forks. The reinforcement elements may thus comprise holes corresponding to the first through hole of the strut. The reinforcement elements may be attached to the first end of the mechanical self-levelling device, for example by welding. Thus, the reinforcement elements may form part of the self-levelling device. Alternatively, the reinforcement elements may form part of the knee link. The knee link may thus comprise a fork arrangement comprising the reinforcement elements. The reinforcement elements of the knee link may extend along the outside of the first and second fork of the self-levelling device. In another example, the reinforcement device may be comprised in the first end of the self-levelling device. Thus, the first and second fork of the self-levelling device may in themselves comprise the reinforcement device. In this example, the first end of the self-levelling device may be a reinforced molded part welded to the rest of the self-levelling device. Thus, the self-levelling device may comprise a molded section and a steel section welded together. By using a molded first end of the self-levelling device, the first and second fork of the self-levelling device will be more robust and durable and no external reinforcement elements are required.

Today, many front loader manufacturers provides front loaders with or without self-levelling function. Typically, a front loader with a self-levelling device includes a certain loader arm and a front loader without a self-levelling device may include a different type of loader arm etc. The self-levelling device according to the present disclosure enables a lower position of the third attachment point and thus the knee link and thereby enables a lower profile of the loader arm. As a result, the knee link can be arranged similarly irrespective of whether there is a self-levelling device or not. Thus, the front loader according to the present disclosure enables a lower position of the knee link and thereby a lower position of the first attachment point and the third attachment point. This enables the tilting cylinder to be configured in the same way irrespective of whether the front loader comprises an overlying self-levelling device or not. With one and the same tilting cylinder, also the loader arm can be configured in the same way irrespective of whether the front loader comprises an overlying self-levelling device or not. Being able to use the same loader arm and tilting cylinder irrespective of the front loader having a self-levelling function or not enables modularity and facilitates manufacturing. Fewer parts will have to be manufactured and the assembly of the two types of front loader will be similar except for an optional last step of mounting the self-levelling device. The knee link may have a similar design for a front loader comprising self-levelling device and a front loader without self-levelling device. Alternatively, the knee link may have a different design depending on whether the front loader comprises a self-levelling device or not.

According to another aspect of the present disclosure, a working vehicle is provided. The working vehicle comprises a front loader as disclosed herein. The working vehicle may be a construction vehicle, a tractor, a mining vehicle, a forestry vehicle, an agriculture vehicle or similar.

The present disclosure will now be further illustrated with reference to the appended figures.

Figure 1B:
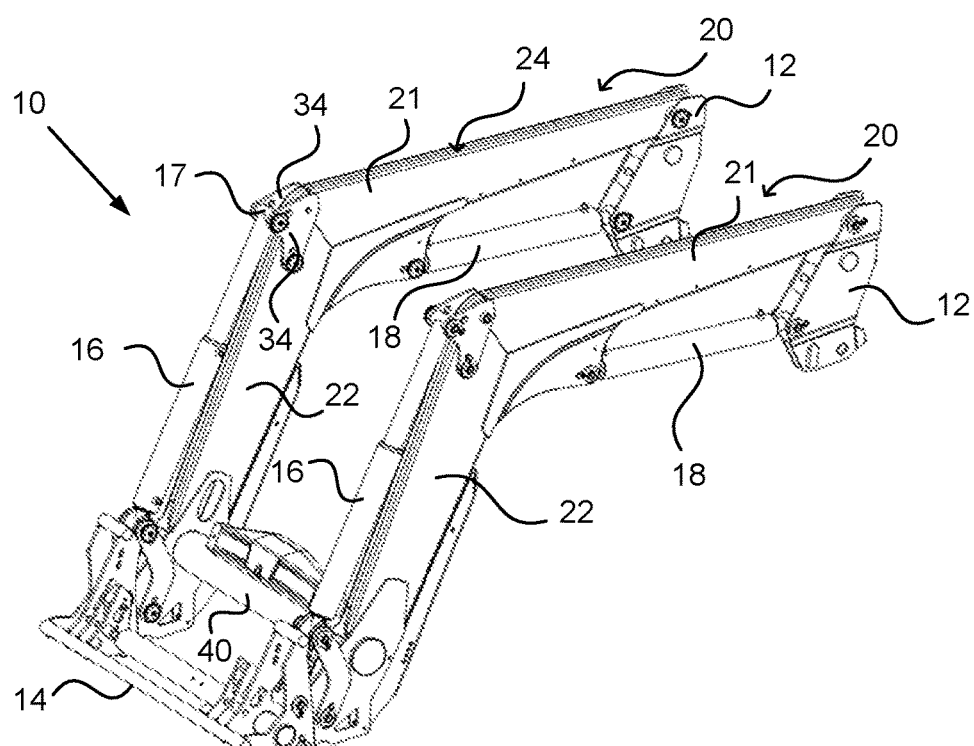

FIGS. 1a-b schematically illustrates a front loader 10 for a working vehicle (see FIG. 4) according to examples. FIG. 1a shows a side view of a front loader 10 comprising: at least one fastening arrangement 12 connectable to the working vehicle; at least one loader arm 20 with a first part 21 and a second part 22 connected via a knee section 23, the first part 21 being pivotally connected to the fastening arrangement 12 at a pivot point P1; a tool attachment device 14 connected to the second part 22 of the loader arm 20; at least one tilting cylinder 16 connected to the tool attachment device 14 and to a knee link 30 arranged at the knee section 23 of the at least one loader arm 20, wherein the knee link 30 comprises a first attachment point 31 for connection with the tilting cylinder 16, a second attachment point 32 for connection with the loader arm 20, and a third attachment point 33 for connection to a mechanical self-levelling device (not shown) configured to be arranged externally of the loader arm 20 and to be connected to the fastening arrangement 12 at a point positioned above the pivot point P1 of the loader arm 20. The knee link 30 is arranged at the knee section 23, such that the first attachment point 31 is essentially aligned with or below an upper end 24 of the first part 21 of the loader arm 20.

The loader arm 10 is pivotable in relation to the fastening arrangement 12 about the pivot point P1 and can thus be pivoted/moved from a lowered position to a plurality of raised positions. In this figure, the front loader 10 is arranged in a lowered position.

The front loader 10 comprises at least one lift cylinder 18 connected to the loader arm 20 and to the fastening arrangement 12. The lift cylinder 18 may be connected to the fastening arrangement 12 at a point vertically below the pivot point P1 of the loader arm 20. The fastening arrangement 12 is configured to be attached to the working vehicle. The lift cylinder 18 may thus be controlled to pivot the loader arm 20 upwards and downwards in relation to the working vehicle, when the front loader 10 is attached to the working vehicle. The lift cylinder 18 and the tilting cylinder 16 may be hydraulic cylinders.

The first part 21 and the second part 22 of the loader arm 20 are elongated. The first part 21 and the second part 22 forms the knee section 23 where they meet and are connected to each other. The first part 21 may comprise a first end 21' connected to the fastening arrangement 12 and a second end 21" forming the knee section 23 with the second part 22. The second part 22 may comprise a first end 22' forming the knee section 23 with the first part 21, and a second end 22" connected to the tool attachment device 14.

The tool attachment device 14 is configured to receive and be connected to a tool, such as a bucket, lifting forks or similar. The tool attachment device 14 can be tilted by means of the tilting cylinder 16. This way, the tool attached to the tool attachment device 14 can be tilted. The tilting cylinder 16 may extend in parallel with the second part 22 of the loader arm 20.

The knee link 30 may extend beyond the knee section 23 in the forward direction of the working vehicle, such that the first attachment point 31 is arranged in front of the knee section 23 of the loader arm 20. An upper end 35 of the knee link 30 is aligned with, or below, the upper end 24 of the first part 21 of the loader arm 20. The second attachment point 32 may be positioned below the pivot point P1 of the loader arm 20 when the loader arm 20 is in the lowered position. The second attachment point 32 of the knee link 30 may be positioned at the second part 22 of the loader arm 20. The second attachment point 32 may thus be used to connect the knee link 30 to the second part 22 of the loader arm 20. The second attachment point 32 may be positioned below the first attachment point 31 when the loader arm 20 is in the lowered position. The second attachment point 32 may be a pivot point. Thus, the knee link 30 may be pivotally connected to the loader arm 20 via the second attachment point 32. The third attachment point 33 may be positioned below the upper end 24 of the first part 21 of the loader arm 20. The third attachment point 33 may be positioned between the first attachment point 31 and the second attachment point 32, in vertical direction. The third attachment point 33 may be positioned radially inwards from the tip of the knee section 23.

FIG. 1b shows a front loader 10 according to an example where the front loader 10 comprises two loader arms 20 arranged in parallel. The front loader 10 thus comprises two fastening arrangements 12 where each loader arm 20 is connected to one fastening arrangement 12. The front loader 10 further comprises two tilting cylinders 16, each connected to the tool attachment device 14 and to a respective loader arm 20. The tool attachment device 14 may extend transversely between the two loader arms 20. The tool attachment device 14 is thus connected to both loader arms 20. The front loader 10 also comprises two lift cylinders 18, each connected to one fastening arrangement 12 and one loader arm 20. It is to be understood that the features as disclosed in relation to the front loader 10 in FIG. 1a, are valid for the front loader 10 as disclosed in FIG. 1b. The two loader arms 20 may be connected to each other by means of at least one transverse support 40. The at least one transverse support 40 may be arranged at the second end 22" of the second part 22 of the loader arms 20.

In FIG. 1b is also shown that the knee link 30 may comprise two plates 34 arranged on opposite sides of the knee section 23. Each plate 34 comprises holes forming the first attachment point 31, the second attachment point 32 and the third attachment point 33. The plates 34 are arranged with the holes symmetrically arranged on opposite sides of the knee section 23. The tilt cylinders 16 may be connected to the first attachment point 31 via a pivot pin 17 extending between the holes of the two plates 34 and thereby connecting the two plates 34.

Figure 2A:
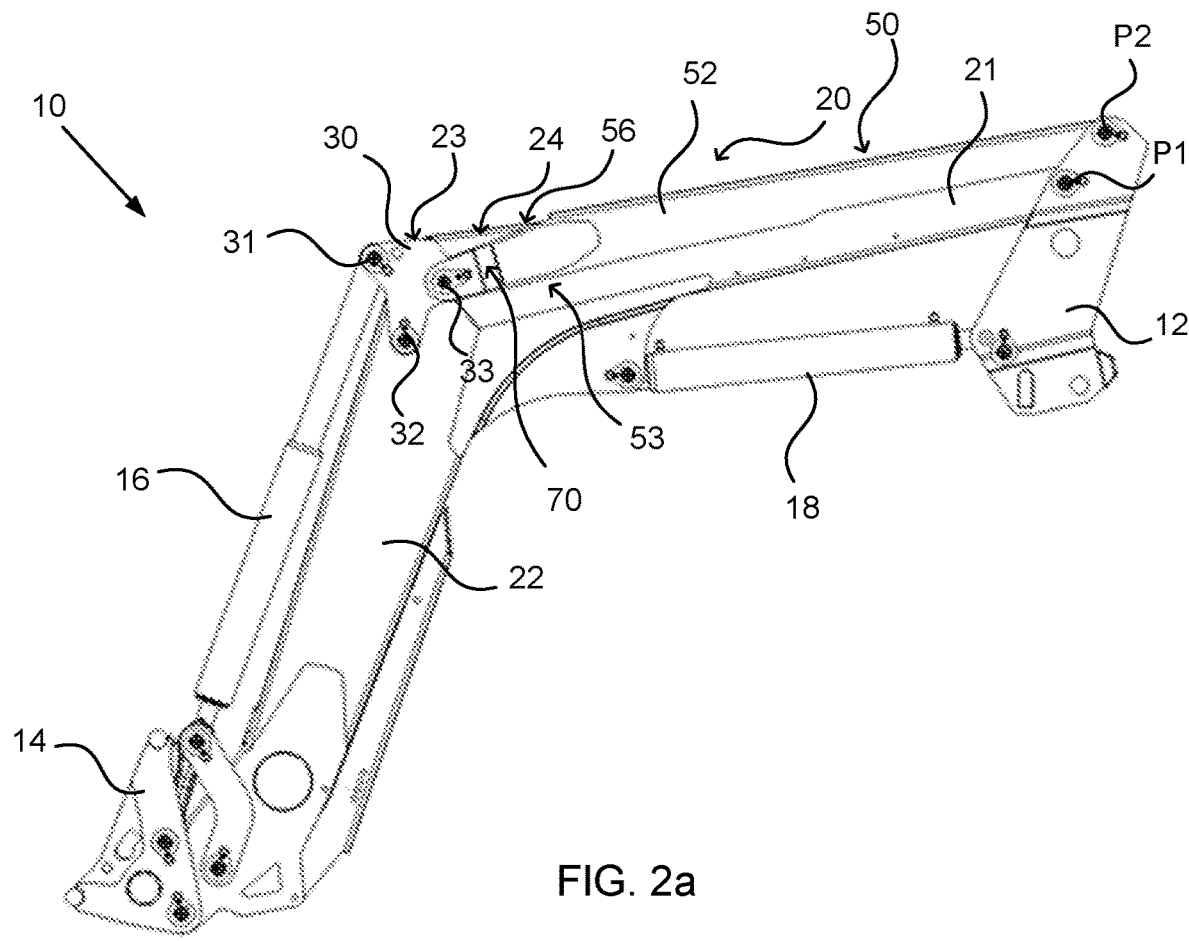
FIGS. 2a-b schematically illustrate a front loader according to examples.
Figure 2B:
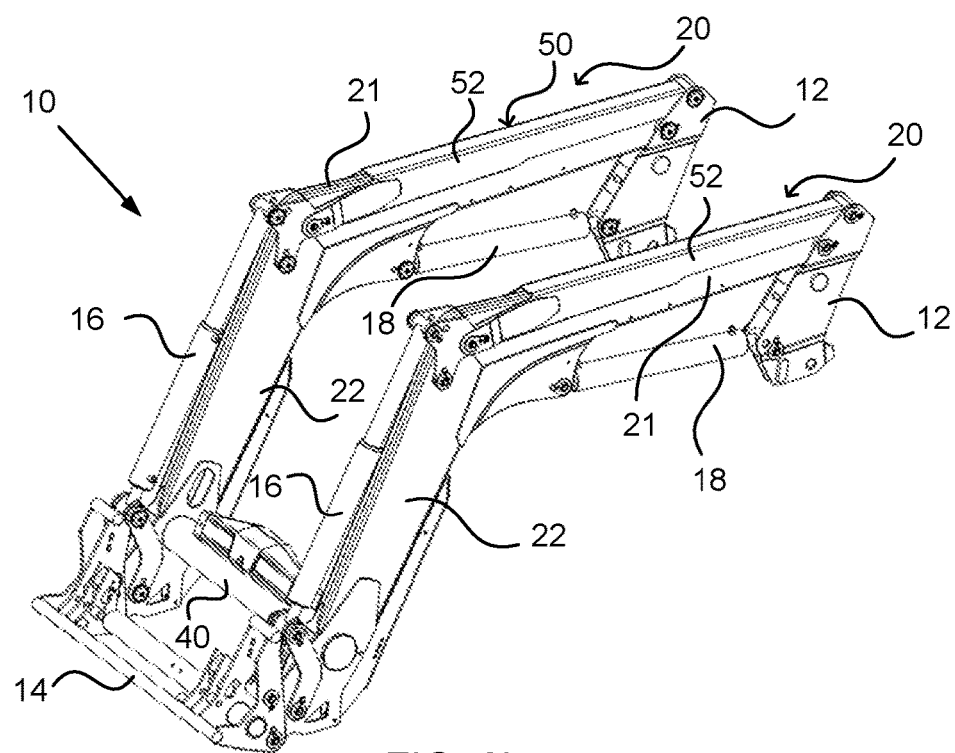

FIGS. 2a-b schematically illustrates a front loader 10 for a working vehicle (see FIG. 4) according to examples. FIG. 2a shows a side view of a front loader 10 configured as disclosed in FIG. 1a. In this example, the front loader 10 further comprises a mechanical self-levelling device 50 connected to the knee link 30 and to the fastening arrangement 12. The self-levelling device 50 is arranged externally of the loader arm 20 and is connected to the fastening arrangement 12 at a connection point P2 positioned above the pivot point P1 of the loader arm 20, a so called overlying self-levelling device. The self-levelling device 50 is connected to the third attachment point 33. The self-levelling device 50 may be arranged, such that the third attachment point 33 is positioned below the connection point P2 to the fastening arrangement 12 when the loader arm 20 is in the lowered position. The self-levelling device 50 may comprise at least one elongated strut 52 configured to at least partly cover the upper end 24 of the first part 21 of the loader arm 20. The strut 52 comprises an opening 56 at a first end 53 connected to the knee link 30. In this example, the front loader 10 may also comprise a reinforcement device 70 for the connection between the self-levelling device 50 and the knee link 30. The self-levelling device 50 is further described with regard to FIG. 3.

FIG. 2b shows a front loader 10 as disclosed in FIG. 1b but further comprising the self-levelling device 50 as disclosed in FIG. 2a. The self-levelling device 50 will in this example comprise two struts 52 configured to at least partly cover the upper end 24 of the first part 21 of the respective loader arm 20. The figure shows the struts 52 being attached to each plate 34 of the knee links 30 and thus on both sides of the loader arms 20.

Figure 3:
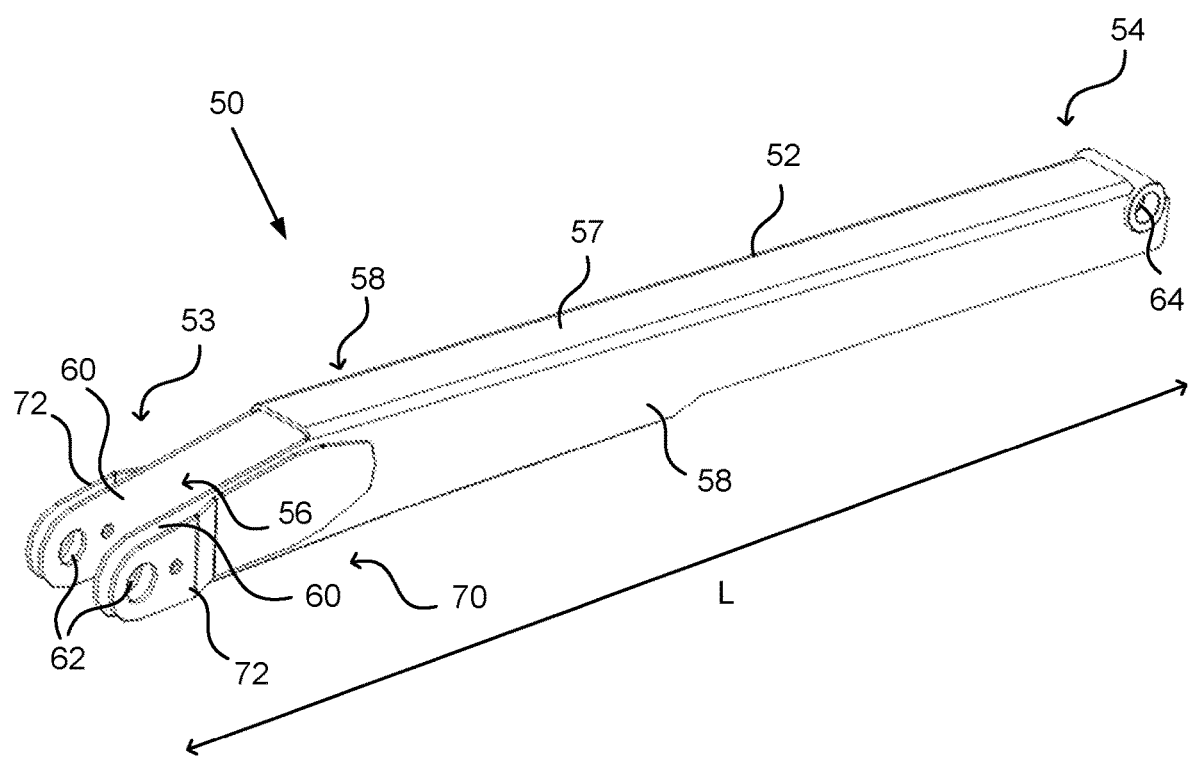
FIG. 3 schematically illustrates a self-levelling device according to an example.

FIG. 3 schematically illustrates a self-levelling device 50 according to an example. The self-levelling device 50 may be configured as disclosed in FIGS. 2a-b. The self-levelling device 50 may thus be configured to be used on a front loader 10 as disclosed in FIGS. 2a-b. The self-levelling device 50 thus comprises at least one elongated strut 52. The strut 52 may have a longitudinal extension L. In this figure, only one strut 52 is disclosed, but it is to be understood that all features relating to this strut 52 is applicable on all struts 52 of a self-levelling device 50. The strut 52 is configured to be attached to the knee link 30 at the third attachment point 33 and to the fastening arrangement 12. The strut 52 may be configured to be pivotally attached to the knee link 30 at the third attachment point 33. The strut 52 may comprise a first end 53 attached to the knee link 30, and a second end 54 connected to the fastening arrangement 12.

The strut 52 may have an essentially u-shaped cross-section and comprise a top wall 57 and two side walls 58. The opening 56 is formed in the top wall 57 at the first end 53 of the strut 52. The strut 52 may be configured to be arranged with the inner side of the top wall 57 abutting or at least extending in parallel with the upper end 24 of the first part 21 of the loader arm 20, with the side walls 58 extending downwards along the sides of the first part 20. The side walls 58 of the strut 52 may thus cover at least a part of the sides of the first part 21 of the loader arm 20. Due to the opening 56 at the first end 53 of the strut 52, the side walls 58 will, at the first end 53, form a first and second fork 60 configured to be attached to the knee link 30 at the third attachment point 33.

The first end 53 of the strut 52 may comprise a first through hole 62 for connection to the knee link 30. The first through hole 62 may extend through the side walls 58 and thus extend through both forks 60. This may alternatively be described as each side wall 58/fork 60 comprising a first through hole 62. The first through hole 62 extends perpendicularly to the longitudinal extension L of the strut 52. The second end 54 of the strut 52 may comprise a second through hole 64. The second through hole 64 extends perpendicularly to the longitudinal extension L of the strut 52.

In this example, the self-levelling device 50 comprises the reinforcement device 70. Thus, the reinforcement device 70 forms part of the self-levelling device 50. The reinforcement device 70 comprises two reinforcement elements 72 arranged on opposite sides of the first end 53 of the strut 52. The reinforcement elements 72 may be arranged on the outside of the first and second fork 60 formed at the first end 53 of the strut 52. The reinforcement elements 72 may have a similar design/shape as the first and second fork 60. The reinforcement elements 72 may thus comprise holes corresponding to the first through hole 62 of the strut 52. The reinforcement elements 72 may be attached to the outside of the first and second fork 60 by means of welding.

Figure 4:
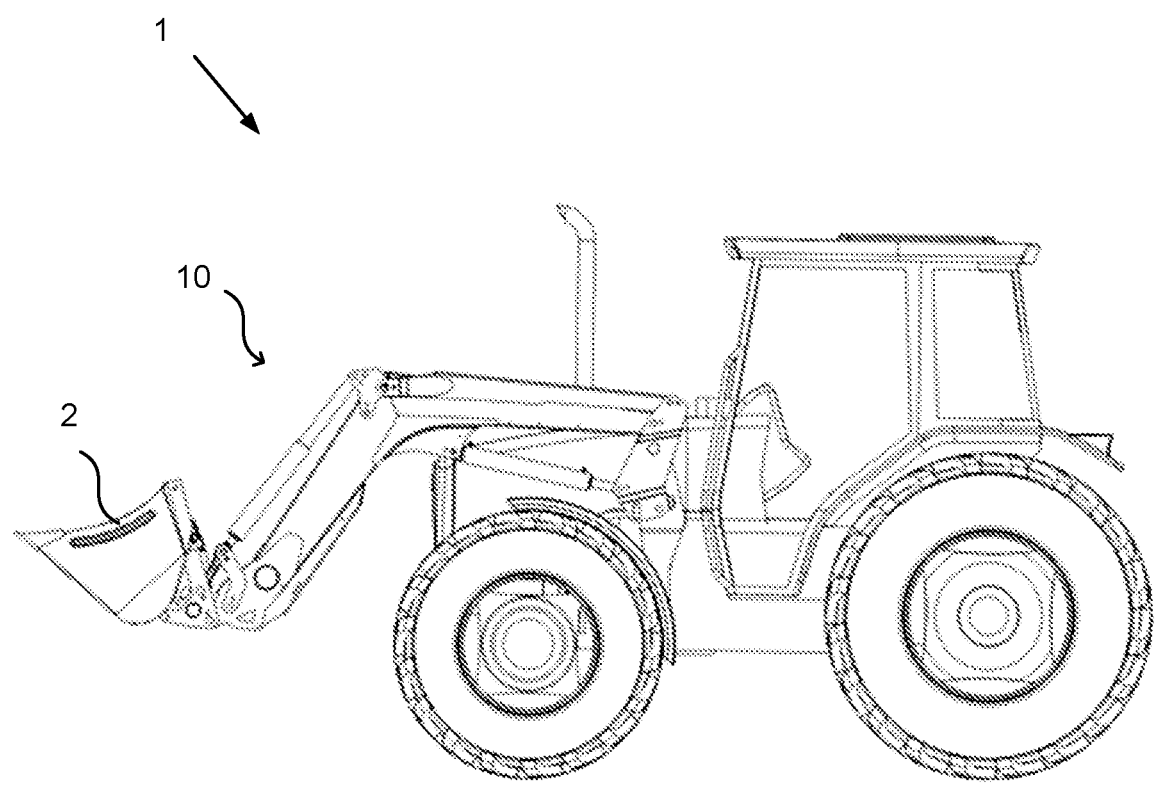
FIG. 4 schematically illustrates a working vehicle according to an example.

FIG. 4 schematically illustrates a working vehicle 1 according to an example. The working vehicle 1 comprises a front loader 10 as disclosed in FIGS. 1a-b or FIGS. 2a-b. The working vehicle 1 may be a construction vehicle, a tractor, a mining vehicle, a forestry vehicle, an agriculture vehicle or similar. The front loader 10 is attached to the front of the working vehicle 1 and is connected to a tool 2, such as a bucket, lifting forks or similar. In this figure, the front loader 10 is in a raised position. With the front loader 10 according to the present disclosure, the knee link 30 is aligned with the upper end 24 of the first part 21 of the loader arm 20 and the knee link 30 will not obstruct the view from the working vehicle 1.

The foregoing description of the examples of the present disclosure is provided for illustrative and descriptive purposes. It is not intended to be exhaustive or to restrict the disclosure to the variants described. Many modifications and variations will obviously be apparent to one skilled in the art. The examples have been chosen and described in order best to explain the principles of the disclosure and its practical applications and hence make it possible for specialists to understand the disclosure for various examples and with the various modifications appropriate to the intended use.

The invention claimed is:

1. A front loader (10) for a working vehicle (1), the front loader (10) comprising:
   at least one fastening arrangement (12) connectable to the working vehicle (1);
   at least one loader arm (20) with a first part (21) and a second part (22) connected via a knee section (23), the first part (21) being pivotally connected to the fastening arrangement (12) at a pivot point (P1);
   a tool attachment (14) device connected to the second part (22) of the at least one loader arm (20);
   at least one tilting cylinder (16) connected to the tool attachment device (14) and to a knee link (30) arranged at the knee section (23) of the at least one loader arm (20),
   wherein the knee link (30) comprises a first attachment point (31) for connection with the tilting cylinder (16), a second attachment point (32) for connection with the loader arm (20), and a third attachment point (33) for connection to a mechanical self-levelling device (50) configured to be arranged externally of the loader arm (20) and to be connected to the fastening arrangement (12) at a point positioned above the pivot point (P1) of the loader arm (20), wherein the knee link (30) is arranged at the knee section (23), such that the first attachment point (31) is essentially aligned with or below an upper end (24) of the first part (21) of the loader arm (20) at a point where the knee link (30) is coupled to the first part (21) and wherein the third attachment point (33) is positioned below the upper end (24) of the first part (21) of the loader arm (20) at the point where the knee link (30) is coupled to the first part (21).

2. The front loader (10) according to claim 1, wherein the second attachment point (32) is positioned below the pivot point (P1) of the loader arm (20) when the loader arm (20) is in a lowered position.

3. The front loader (10) according to claim 1, further comprising:
   the mechanical self-levelling device (50) connected to the knee link (30) at the third attachment point (33),
   wherein the self-levelling device (50) is arranged externally of the loader arm (20) and is connected to the fastening arrangement (12) at a connection point (P2) positioned above the pivot point (P1) of the loader arm (20).

4. The front loader (10) according to claim 3, wherein the self-levelling device (50) comprises at least one strut (52) configured to at least partly cover the upper end (24) of the first part (21) of the loader arm (20), wherein the strut (52) comprises an opening (56) at a first end (53) connected to the knee link (30).

5. The front loader (10) according to claim 4, wherein the strut (52) has an essentially u-shaped cross-section and comprises a top wall (57) and two side walls (58), wherein the opening (56) is formed in the top wall (57) at the first end (53) of the strut (52).

6. The front loader (10) according to any one of claim 5, further comprising
   a reinforcement device (70) for the connection between the mechanical self-levelling device (50) and the knee link (30).

7. The front loader (10) according to claim 6, wherein the reinforcement device (70) comprises two reinforcement elements (72) extending on opposite sides of the first end (53) of the strut (52).

8. The front loader (10) according to claim 7, wherein the reinforcement elements (72) form part of the knee link (30).

9. The front loader (10) according to claim 8, wherein the self-levelling device (50) is arranged, such that the third attachment point (33) is positioned below the connection point (P2) to the fastening arrangement (12).

10. A working vehicle (1), comprising the front loader (10) of claim 1.

* * * * *